(12) United States Patent
Van Den Brink

(10) Patent No.: US 9,566,730 B2
(45) Date of Patent: Feb. 14, 2017

(54) METHOD AND SYSTEM FOR PRODUCING AN INJECTION MOULDED PRODUCT AND A LABEL TRANSFER DEVICE

(75) Inventor: Willem Van Den Brink, Harskamp (NL)

(73) Assignee: Polymac B.V., Ede (NL)

( * ) Notice: Subject to any disclaimer, the term of this patent is extended or adjusted under 35 U.S.C. 154(b) by 474 days.

(21) Appl. No.: 14/344,290

(22) PCT Filed: Aug. 30, 2012

(86) PCT No.: PCT/NL2012/050594
§ 371 (c)(1),
(2), (4) Date: Jul. 7, 2014

(87) PCT Pub. No.: WO2013/039382
PCT Pub. Date: Mar. 21, 2013

(65) Prior Publication Data
US 2014/0339733 A1    Nov. 20, 2014

(30) Foreign Application Priority Data

Sep. 12, 2011   (NL) .................................... 2007390

(51) Int. Cl.
*B29C 45/14*    (2006.01)
*B29C 45/26*    (2006.01)
(Continued)

(52) U.S. Cl.
CPC ......... *B29C 45/14008* (2013.01); *B29C 45/26* (2013.01); *B29C 2045/14057* (2013.01);
(Continued)

(58) Field of Classification Search
CPC .............................................. B29C 45/14008
See application file for complete search history.

(56) References Cited

U.S. PATENT DOCUMENTS

| 5,053,101 A | 10/1991 | Dromigny |
| 5,205,885 A | 4/1993 | Schutz |

(Continued)

FOREIGN PATENT DOCUMENTS

| CN | 1106738 A | 8/1995 |
| CN | 1134869 A | 11/1996 |

(Continued)

OTHER PUBLICATIONS

International Search Report mailed Dec. 20, 2012 (PCT/NL2012/050594); ISA/EP.

(Continued)

*Primary Examiner* — Galen Hauth
(74) *Attorney, Agent, or Firm* — Banner & Witcoff, Ltd.

(57) ABSTRACT

In an injection mould, a plastic injection-moulded product is manufactured. The plastic injection-moulded product comprises a tubular body, a neck part and a head part. The injection mould comprises three mould parts, which are displaceable with respect to each other between a closed position and an open position. The first mould part comprises a first mould cavity for producing the neck part and the head part. The second mould part comprises a second mould cavity for producing the tubular body. The third mould part comprises a core body. In the open position, a neck label is arranged in the first mould cavity of the first mould part and a peripheral label is arranged in the second mould part. Subsequently, the mould parts are moved to the closed position to form a closed mould cavity. By supplying plastic, the plastic injection-moulded product is produced. The labels are integrally formed in the plastic injection-moulded product ("in-mould labelling").

14 Claims, 15 Drawing Sheets

(51) Int. Cl.
    *B29L 23/20*    (2006.01)
    *B29K 101/00*   (2006.01)
    *B29L 22/00*    (2006.01)
    *B29L 23/00*    (2006.01)

(52) U.S. Cl.
    CPC    *B29C 2045/14926* (2013.01); *B29K 2101/00* (2013.01); *B29L 2022/00* (2013.01); *B29L 2023/00* (2013.01); *B29L 2023/20* (2013.01)

(56)            References Cited

U.S. PATENT DOCUMENTS

| | | |
|---|---|---|
| 5,654,017 A | 8/1997 | Harmsen |
| 2007/0164116 A1* | 7/2007 | Quemeneur ...... B29C 45/14598 235/487 |
| 2007/0190275 A1 | 8/2007 | Helmenstein |
| 2013/0125431 A1* | 5/2013 | Brown .............. B29C 45/14008 40/299.01 |

FOREIGN PATENT DOCUMENTS

| | | |
|---|---|---|
| EP | 0519142 A1 | 12/1992 |
| EP | 2332712 A1 | 6/2011 |
| JP | 01127307 A | 5/1989 |
| JP | 02122909 A | 5/1990 |

OTHER PUBLICATIONS

Dutch Search Report with a date of completion of Apr. 26, 2012 (2007390); ISA/EP.

\* cited by examiner

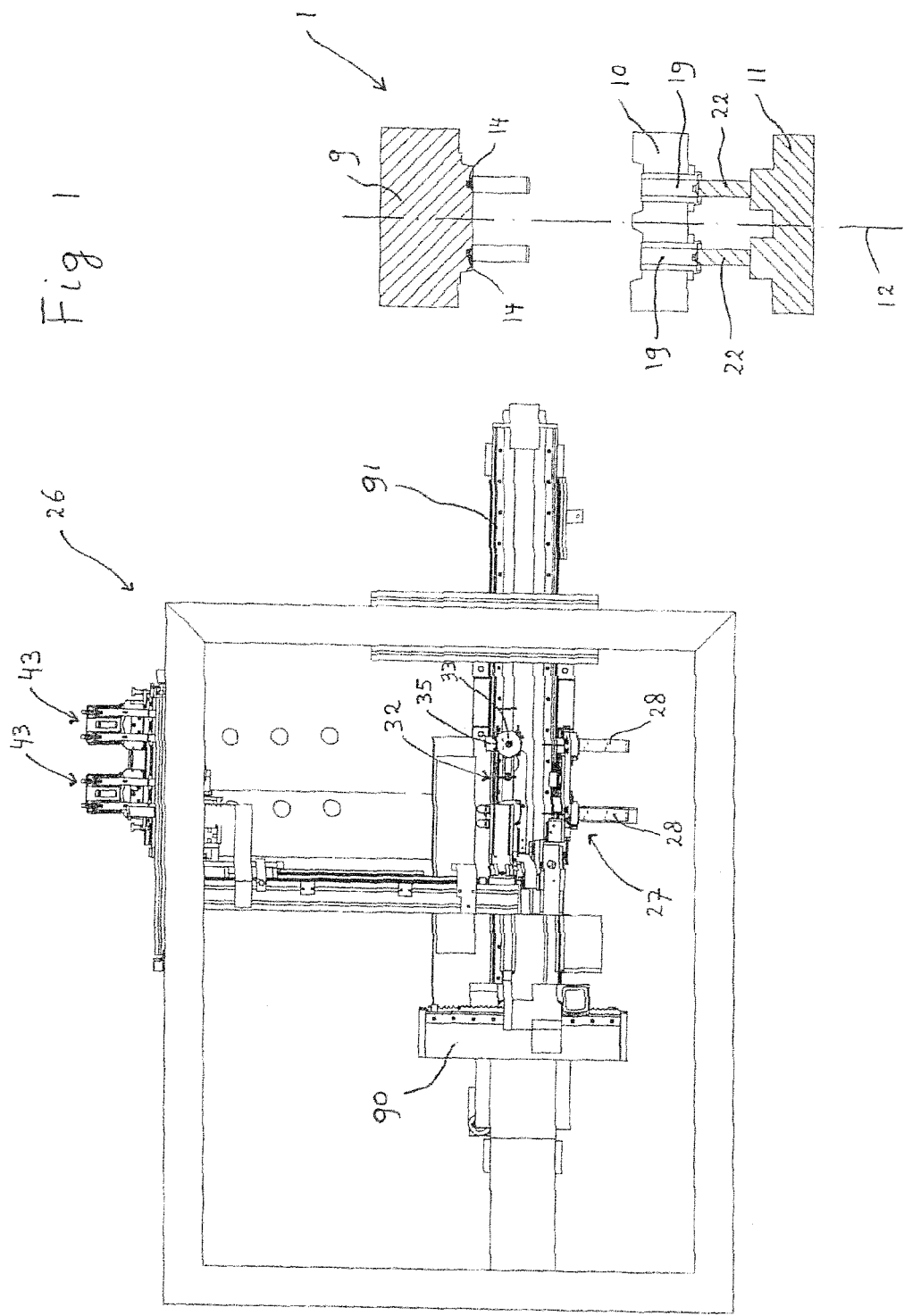

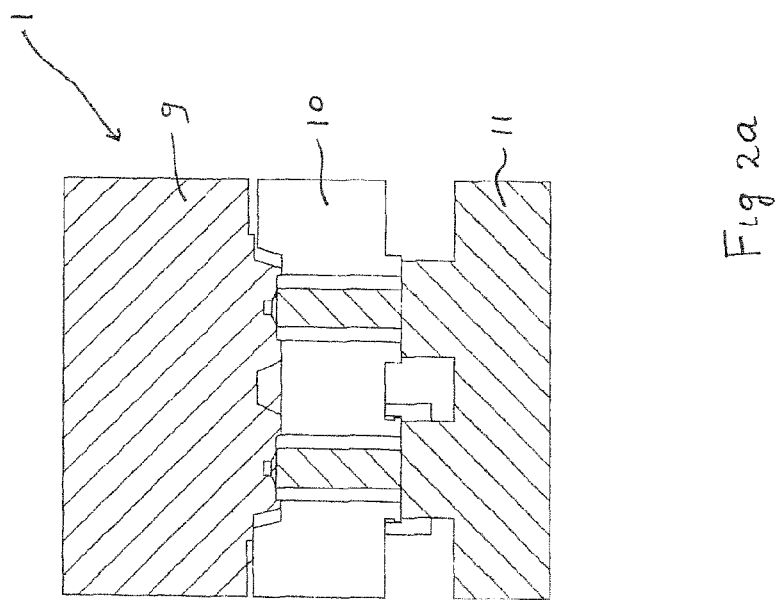
Fig 2a
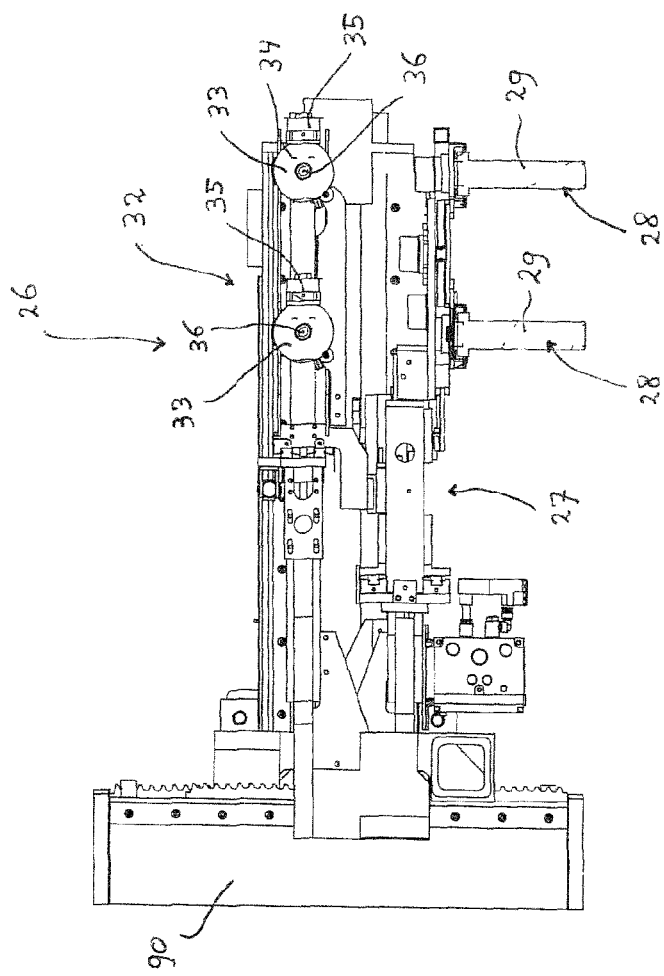

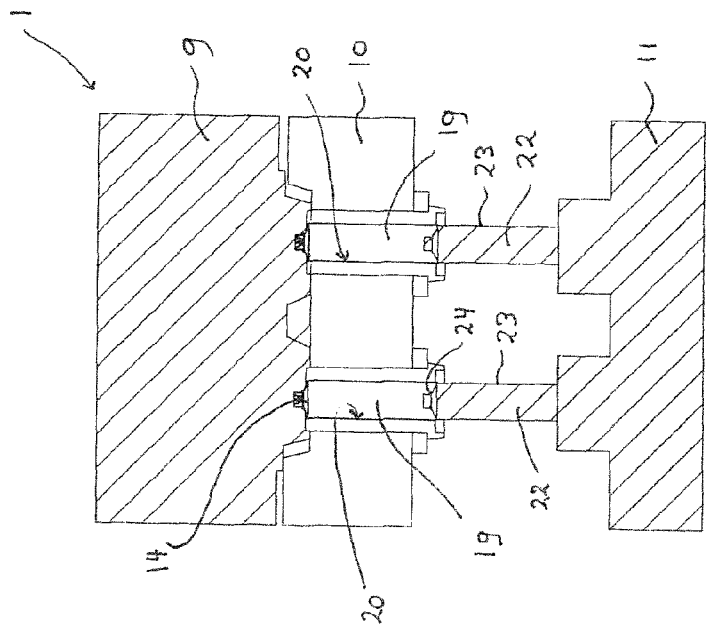
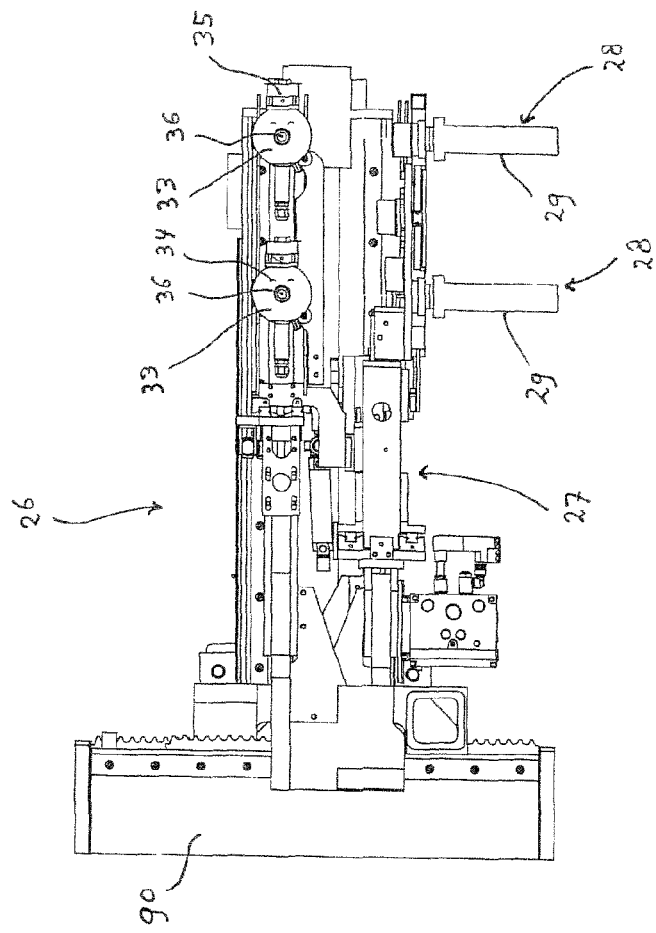
Fig 2b

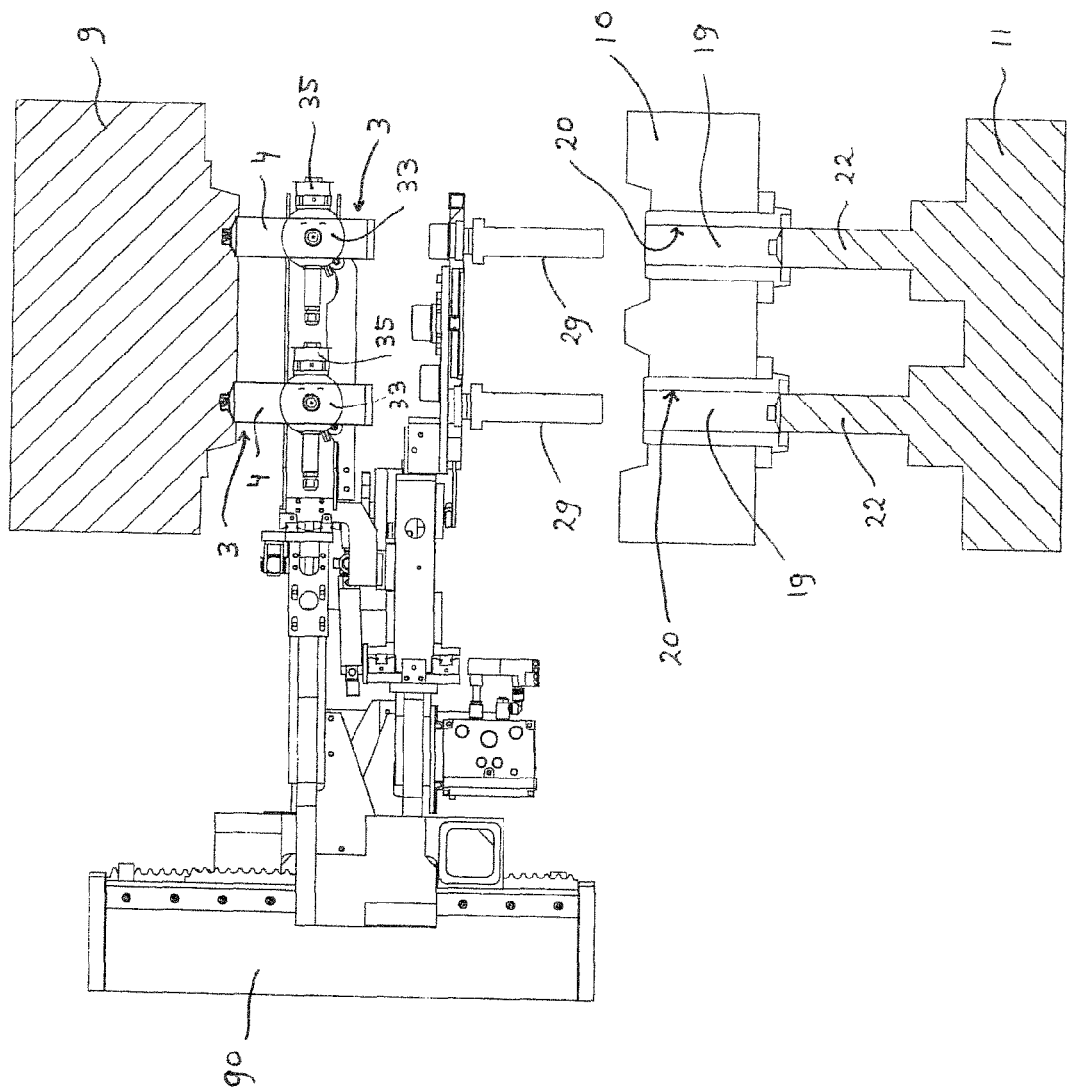

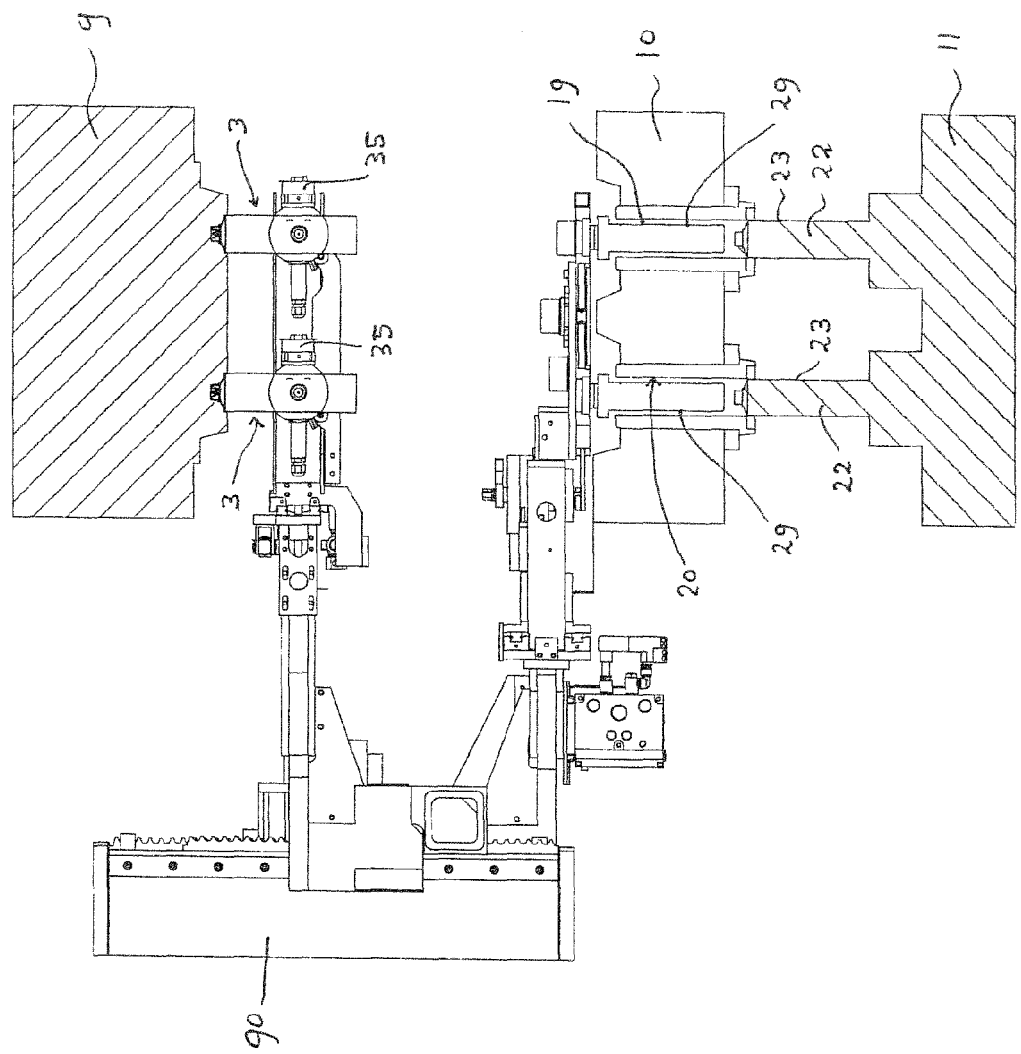

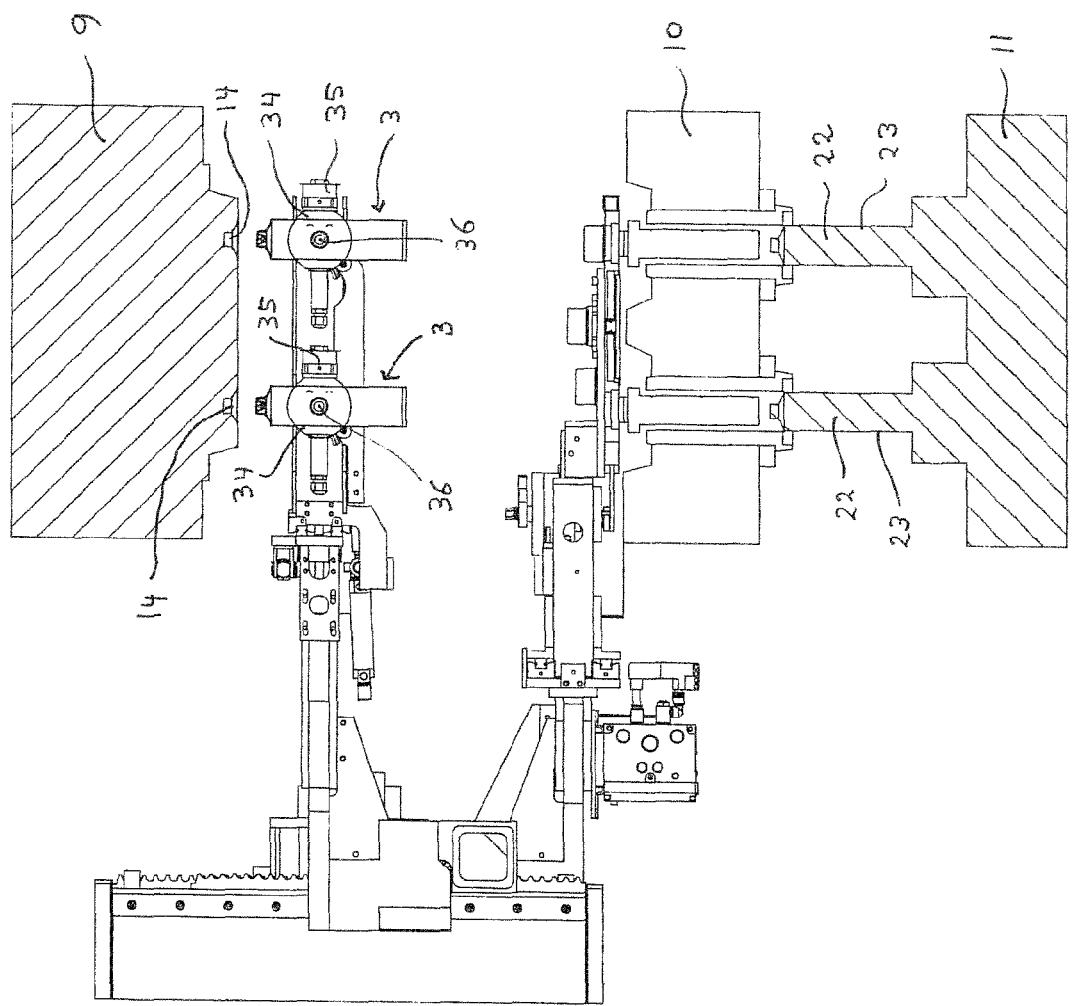

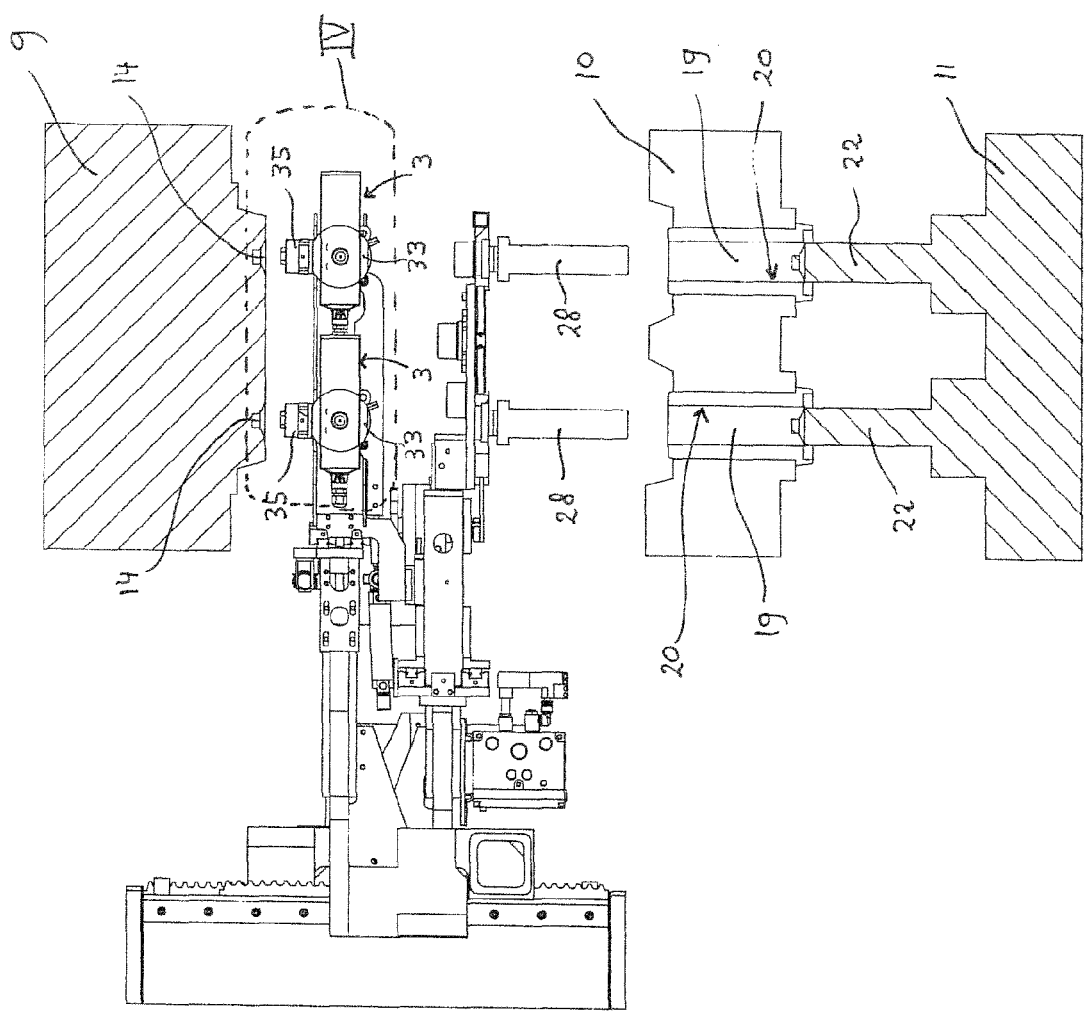

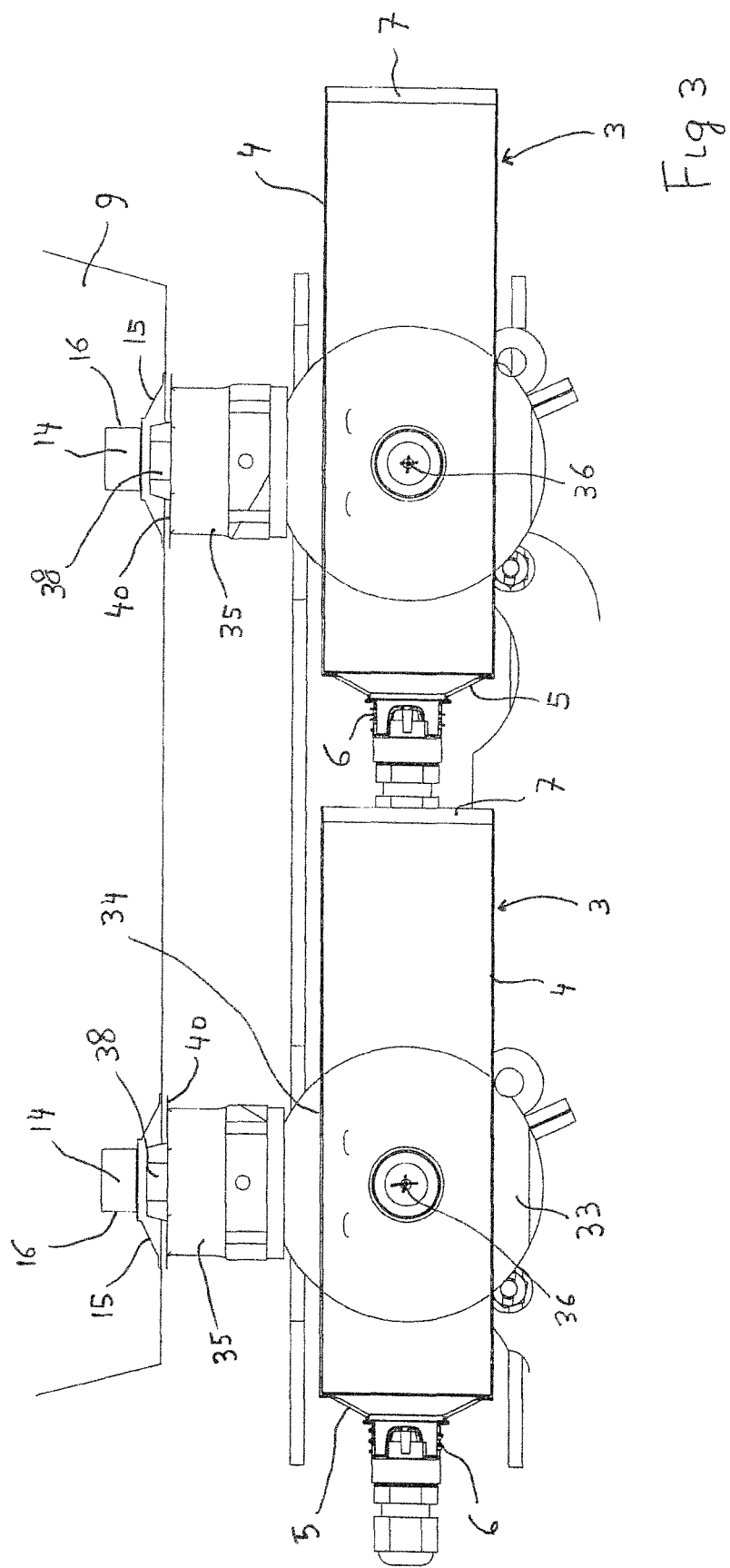

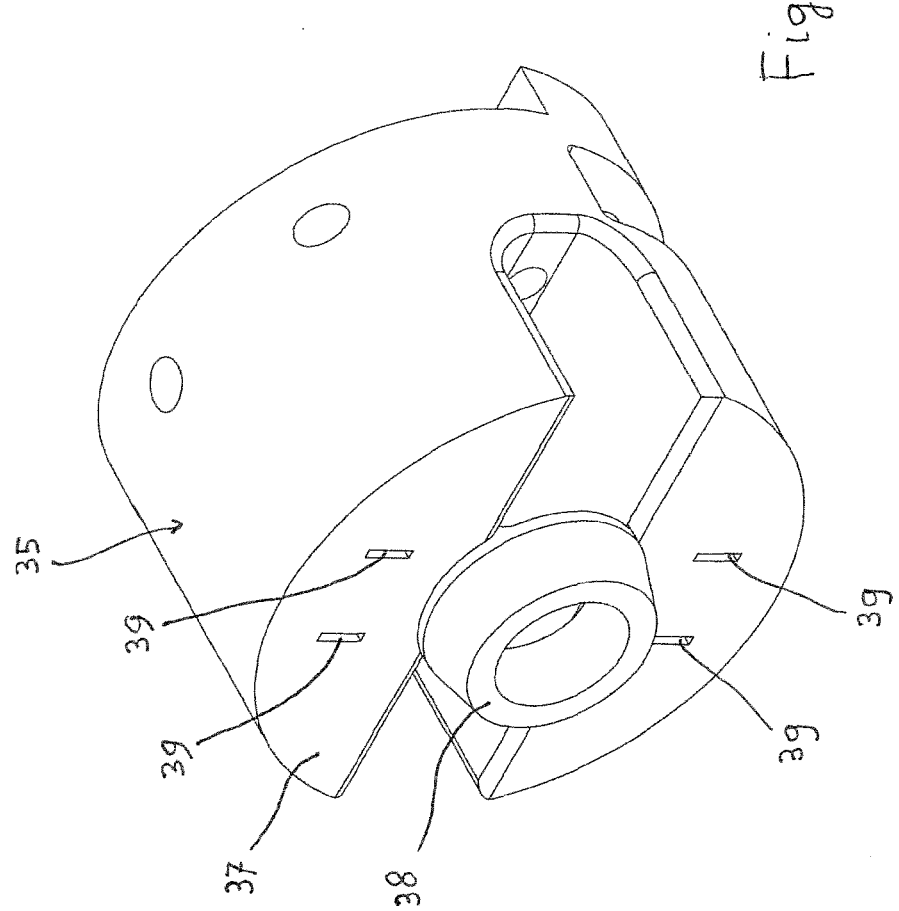

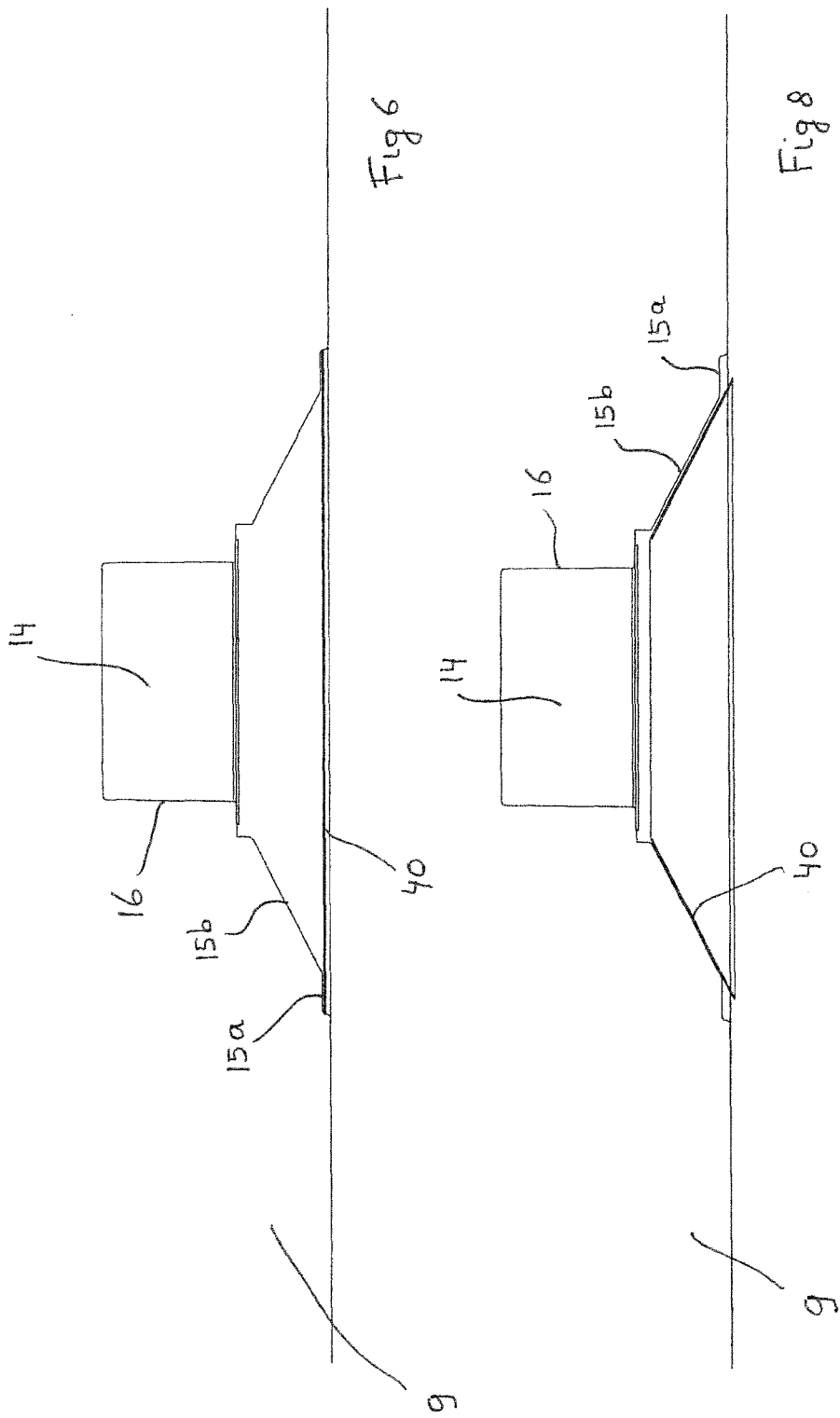

METHOD AND SYSTEM FOR PRODUCING AN INJECTION MOULDED PRODUCT AND A LABEL TRANSFER DEVICE The present application is a U.S. National Phase filing of International Application No. PCT/NL2012/050594, filed on Aug. 30, 2012, designating the United States of America, which in turn claims priority to Netherlands Application 2007390, filed Sep. 12, 2011. The present application claims priority to and the benefit of all the above-identified applications, which are incorporated by reference herein.

The invention relates to the field of in-mould labelling in which a label is placed in a mould cavity of an injection mould after which plastic is injected into the mould cavity to form an injection-moulded product with the label.

The invention also relates to a method for producing, in an injection mould, a plastic injection-moulded product comprising a tubular body, a neck part which is connected to an end of the tubular body, and a head part which is connected to an end of the neck part facing away from the tubular body, in which, optionally, the tubular body comprises an open end situated opposite the head part which can be flattened and closed to produce a collapsing tube, which injection mould comprises:
 a first mould part which is provided with a first mould cavity having a wall which corresponds to the shape of the external surface of the neck part and of the head part of the plastic product to be produced, which first mould part is provided with a supply duct for the supply of plastic, which supply duct opens into the first mould cavity,
 a second mould part which is provided with a second mould cavity having a wall which corresponds to the shape of the external surface of the tubular body of the plastic product to be produced, and
 a third mould part which is provided with a core body having a wall which corresponds to the shape of at least the internal surface of the tubular body and to the shape of the internal surface of the neck part and, optionally, to the shape of the internal surface of the head part of the plastic product to be produced,
which method comprises:
 moving the first, second and third mould parts of the injection mould apart into an open position to enable placement of a peripheral label in the second mould cavity,
 in the open position of the first, second and third mould parts, placing the peripheral label in the second mould cavity,
 moving the first, second and third mould parts from the open position to a closed position, in which the first, second and third mould parts bear against each other to form a closed mould cavity,
 supplying plastic via the supply duct of the first mould part to form the plastic injection-moulded product in the closed mould cavity.

US 2007/0190275 discloses a method for producing a plastic tube. The tube comprises a cylindrical tube body, the front end of which is provided with a tube shoulder. A threaded part extends from the tube shoulder. The threaded part is connected to a tube outlet via a transition part. The tube outlet comprises a closed end wall which can be cut off or pierced to open the tube.

The tube is made using an injection mould which is provided with an end mould, a female die, and a core holder. The end mould comprises two displaceable jaws and a centring insert. The jaws and the centring insert form the part of the mould cavity for moulding the front part of the tube. An injection duct is provided in the centring insert for injecting plastic. The cylindrical tube body is formed using the female die which comprises a substantially cylindrical mould channel. The mould channel forms the external surface of the mould cavity. The core holder comprises a core which is arranged in the mould channel via the rear end of the female die. The core then determines the internal surface of the mould cavity. The front end of the core comprises a cap which moulds the internal surface of the tube shoulder.

First, the female die and the core are both withdrawn from the end mould, so that the injection mould is open. A label is arranged in the mould cavity, which will be integrated into the tube during injection-moulding of the plastic in the mould cavity. The label comprises, for example, a print or a decorative pattern. It is also possible for the label to be made of a material having better barrier properties against gases or water vapour than the basic material of the tube. After the label has been arranged in the mould cavity, the mould is closed by moving the female die with the core positioned therein up to the jaws of the end mould.

Subsequently, plastic is injected from the injection duct into the mould cavity. After the tube has been formed in the mould cavity, the core is withdrawn from the female die, following which the female die is also withdrawn. The jaws are then moved away from the end mould in the axial direction so that the tube outlet is released. Subsequently, the jaws are opened, allowing the tube to fall out of the end mould.

This document mentions that the label may extend into the region of the tube shoulder. However, it does not describe how the label is placed in the mould cavity. In practice, it is already very difficult to arrange a label which only extends in the mould channel of the female die in the correct position. The label is relatively thin and may, for example, consist of a film of 40-140 μm. In order to introduce the label at the desired position, the label is, for example, wound around a mandrel, after which the mandrel with the accommodated label is introduced into the female die. In view of the precise positioning of the label, the annular gap between the label and the mould channel of the female die is kept relatively small. As a result thereof, there is a (very) small clearance for introducing the mandrel. In addition, the label is usually printed on one side, as a result of which the label tends to warp. In practice, it is also possible for so-called dog ears to be present or develop on one or more corners of the label.

If the label only extends in the mould channel of the female die, it is therefore already very difficult to position the label accurately in the mould cavity. If the label extends additionally in the region of the tube shoulder, it is even more difficult to ensure that the label ends up in the mould cavity in the correct position. In this case, there is even a risk of the label creasing or bending, which may result in jamming or damage. However, for some applications, it is desirable to provide a label in the region of the tube shoulder, for example a label which is not, or hardly, permeable to oxygen.

It is an object of the invention to provide an improved method for producing a plastic injection-moulded product in an injection mould.

This object is achieved according to the invention by the fact that the peripheral label is placed in the second mould cavity by a label transfer device, which is provided with a mandrel for accommodating the peripheral label, and that the peripheral label is arranged around a peripheral wall of the mandrel of the label transfer device in a peripheral label-receiving position of the mandrel outside the injection mould, in the open position of the first, second and third mould parts, the mandrel with the peripheral label arranged around the peripheral wall thereof are moved from the peripheral label-receiving position outside the injection mould to a peripheral label-dispensing position in the second mould cavity, the peripheral label is transferred from the peripheral wall of the mandrel to the wall of the second mould cavity in the peripheral label-dispensing position of the mandrel, the mandrel is returned from the peripheral label-dispensing position to the peripheral label-receiving position outside the injection mould, and that the label transfer device is furthermore provided with a holder for accommodating an annular neck label, and that, the neck label is arranged on the holder of the label transfer device in a neck label-receiving position of the holder outside the injection mould, in the open position of the first, second and third mould parts, the holder with the accommodated neck label are moved from the neck label-receiving position outside the injection mould to a neck label-dispensing position for dispensing the neck label in the first mould cavity of the first mould part, the neck label is transferred from the holder to the first mould cavity in the neck label-dispensing position of the holder, and the holder is returned from the neck label-dispensing position to the neck label-receiving position outside the injection mould.

According to the invention, the label transfer device comprises a mandrel for accommodating the peripheral label and a holder for accommodating the annular neck label. The peripheral label and the neck label are two separate labels. The peripheral label is wound around the mandrel and retained in the peripheral label-receiving position outside the injection mould. The neck label is arranged on the holder and retained in the neck label-receiving position outside the injection mould.

The mandrel and the holder then move in the open position of the first, second and third mould parts to the label-dispensing positions for dispensing the peripheral label or the neck label, respectively, for example via the opening between the first and second mould parts. The peripheral label is transferred from the mandrel to the wall of the second mould cavity. The neck label is transferred from the holder to the first mould cavity. Subsequently, the mandrel and the holder return to the label-receiving positions outside the injection mould.

The injection mould is then closed by moving the first, second and third mould parts to the closed position, thus forming the closed mould cavity containing the peripheral label and the neck label. The closed mould cavity is formed between the wall of the core body and the walls of the first and second mould cavity.

The abovementioned document US 2007/0190275 teaches that a single label is used, also if a label is desirable in the region of the tube shoulder: the single label then extends into the region of the tube shoulder. By contrast, according to the invention, two separate labels are used, namely the peripheral label and the annular neck label.

The peripheral label is arranged in the second mould cavity of the second mould part, and, in contrast to what a person skilled in the art would expect, the annular neck label is not arranged on the core body of the third mould part, but in the first mould cavity of the first mould part. The neck label is transferred to the first mould cavity to such a position that the neck label comes to lie at the location of the neck part of the injection-moulded product to be produced.

After the peripheral label and the neck label have been transferred and the mandrel and the holder have been removed, the injection mould can be closed. To this end, the core body of the third mould part is introduced into the second mould cavity of the second mould part. In this case, the core body moves along the peripheral label which is arranged against the wall of the second mould cavity. Since the neck label is not placed on the core body, there is no risk of the position of the peripheral label inadvertently being affected when the core body is moved in the second mould cavity.

When the core body has been completely accommodated in the second mould cavity, an annular gap is formed between the wall of the second mould cavity and the wall of the core body. In this case, the head end of the core body is situated in the first mould cavity, so that the neck label lies between the core body and the part of the first mould cavity which corresponds to the neck part of the injection-moulded product to be produced.

According to the invention, the peripheral label and the neck label can thus be brought to the desired position accurately and independently from each other. Thus, it is ensured that the peripheral label and the neck label are incorporated accurately in the desired position in the plastic injection-moulded product after injection-moulding.

According to the invention, it is possible that, after the neck label, in the neck label-dispensing position of the holder, has been transferred from the holder to the first mould cavity, the neck label extends partly at a distance from the wall of the first mould cavity. In this case, the neck label does not come to rest against the wall of the first mould cavity in a close-fitting manner in its entirety. At the same time, the neck label can be held in the correct position in the first mould cavity due to the fact that a part of the neck label does comes to lie against the wall of the first mould cavity.

After the neck label, in the neck label-dispensing position of the holder, has been transferred from the holder to the first mould cavity, the neck label may partly rest against the wall of the first mould cavity. In this case, it is possible, when supplying plastic via the supply duct of the first mould part, for the plastic to be injected into the first mould cavity in such a manner that the annular neck label is moved in the direction towards the core body.

In this case, the neck label may be overmoulded, that is to say the neck label is moved from the wall of the first mould cavity to the wall of the core body. In the resulting plastic injection-moulded product, the neck label is covered by plastic from the neck part.

According to the invention, it is possible for the holder to be arranged on a carrier which is provided with engagement members for engaging with a produced injection-moulded product, in which the carrier is rotatable about a substantially vertical axis of rotation between an angular position for removing the injection-moulded product and an angular position for dispensing the neck label, and in which, after the injection-moulded product has been produced, the first, second and third mould parts of the injection mould move apart into the open position and the produced injection-moulded product remains retained by the first mould part, and in which then the engagement members of the carrier in the angular position for removing the injection-moulded product remove the retained injection-moulded product from the first mould part, and in which, after the retained injection-moulded product has been removed from the first mould part, the carrier is rotated about the axis of rotation thereof into the angular position for dispensing the neck label, in which, in the angular position of the carrier for dispensing the neck label, the holder with the accommodated neck label are moved to the neck label-dispensing position for dispensing the neck label in the first mould cavity of the first mould part and the neck label is dispensed in the first mould cavity of the first mould part.

In this case, it is possible for the carrier to be rotatable over an angle of substantially 90° between the angular position for removing the injection-moulded product and the angular position for dispensing the neck label. In this case, the carrier rotates a quarter turn between the angular position for removing the injection-moulded product and the angular position for dispensing the neck label. As a result, the carrier can change angular position in a relatively short time, thus making it possible to achieve a high speed. Obviously, according to the invention it is also possible to use larger or smaller angles.

After producing the injection-moulded product, the first, second and third mould parts of the injection mould move apart to the open position. In this case, the head part and possibly the neck part of the produced injection-moulded product are held by the first mould cavity of the first mould part. The axial axis of the tubular body of the produced injection-moulded product in this case runs parallel to the axial axis of the injection mould.

Then, the carrier, in the angular position for removing the injection-moulded product, can be placed, for example, between the first and second mould parts. For example, the carrier is arranged underneath the retained injection-moulded product in such a manner that the engagement members can engage with the tubular body of the retained injection-moulded product. While the engagement members engage with the tubular body of the retained injection-moulded product, the carrier then moves away from the first mould part in the axial direction. As a result thereof, the carrier pulls the retained injection-moulded product out of the first mould cavity of the first mould part.

After the retained injection-moulded product has been removed, the carrier is rotated about the axis of rotation thereof, for example over an angle of approximately 90°, into the angular position for dispensing the neck label. The tubular body of the injection-moulded product then runs transversely to the axial axis of the injection mould, while the neck label arranged on the holder faces the first mould part.

While the carrier remains in the angular position for dispensing the neck label, the carrier is moved towards the first mould part in the axial direction until the holder with the accommodated neck label is aligned with respect to the first mould cavity of the first mould part. The holder with the accommodated neck label is then in the neck label-dispensing position and the neck label is dispensed in the first mould cavity of the first mould part.

Subsequently, the carrier again moves in the axial direction, away from the first mould part. Then, the carrier is moved out from in between the first and second mould parts transversely with respect to the axial axis of the injection mould, so that the first, second and third mould parts of the injection mould can be moved from the open position to the closed position.

According to the invention, after the injection-moulded product has been produced, it is possible for the first, second and third mould parts of the injection mould to move apart into the open position and for the produced injection-moulded product to be retained by the first mould part, and in which, in the open position of the first, second and third mould parts, the mandrel with the peripheral label arranged around the peripheral wall thereof and the holder with the accommodated neck label are moved substantially simultaneously between the first and second mould parts, and in which then the peripheral label is transferred from the peripheral wall of the mandrel to the wall of the second mould cavity and simultaneously the produced injection-moulded product is removed from the first mould part and/or the neck label is transferred to the first mould cavity of the first mould part.

In this case, the produced injection-moulded product is removed from the first mould part and/or the neck label is transferred to the first mould cavity of the first mould part during the time in which the peripheral label is being transferred from the peripheral wall of the mandrel to the wall of the second mould cavity. The time for removing the produced injection-moulded product and transferring the neck label may differ from the time for transferring the peripheral label. By having these steps take place at least partly simultaneously, time is saved. After the injection-moulded product has been removed and the labels have been placed, the mandrel, the holder and the removed injection-moulded product can be moved out from in between the first and second mould parts substantially simultaneously. Thereafter, the injection mould can be closed for the injection-moulding process.

According to the invention, it is possible for the holder to be provided with a stop surface with retaining devices for retaining the annular neck label, as well as a centring lug which projects from the stop surface, in which the annular neck label is accommodated around the centring lug of the holder and the retaining devices retain the neck label while the holder is moved from the neck label-receiving position to the neck label-dispensing position. The annular neck label has a central opening in which the centring lug is accommodated. The centring lug ensures that the annular neck label can be positioned accurately with respect to the first mould cavity of the first mould part.

According to the invention, after the injection-moulded product has been produced, it is possible for the first, second and third mould parts of the injection mould to move apart into the open position by the third mould part first moving at least partly out of the second mould part while the second mould part remains in contact with the first mould part, and the second mould part then moving away from the first mould part. While the second mould part moves away from the first mould part, the third mould part can be moved together with the second mould part.

According to the invention, it is possible for the injection mould to have an axial axis, in which the first, second and third mould parts of the injection mould can be moved along the axial axis. The axial axis of the core body, the axial axis of the second mould cavity of the second mould part, and the axial axis of the first mould cavity of the first mould part run substantially parallel to the axial axis of the injection mould. The first, second and third mould parts of the injection mould can be moved in the direction of the axial axis of the injection mould, that is to say along a straight line.

According to the invention, it is possible for the peripheral label and/or the neck label to comprise a material which is substantially impermeable to gas or (water) vapour, for example an oxygen barrier layer. The material which is substantially impermeable to gas or (water) vapour has better barrier properties with regard to gas or (water) vapour than the plastic from which the injection-moulded product is made. If a slightly permeable plastic is used, the peripheral label can be used to make the tubular body of the injection-moulded product substantially impermeable. By means of the neck label, it is also possible to render the neck part of the injection-moulded product substantially impermeable.

The invention also relates to a system for producing a plastic injection-moulded product comprising a tubular body, a neck part, which is connected to an end of the tubular body, and a head part which is connected to an end of the neck part facing away from the tubular body, in which, optionally, the tubular body comprises an open end situated opposite the head part which can be flattened and closed to produce a collapsing tube, which system is provided with:

an injection mould, comprising:
  a first mould part which is provided with a first mould cavity having a wall which corresponds to the shape of the external surface of the neck part and of the head part of the plastic product to be produced, which first mould part is provided with a supply duct for the supply of plastic, which supply duct opens into the first mould cavity,
  a second mould part which is provided with a second mould cavity having a wall which corresponds to the shape of the external surface of the tubular body of the plastic product to be produced, and
  a third mould part which is provided with a core body having a wall which corresponds to the shape of the internal surface of the tubular body and to the shape of the internal surface of the neck part and, optionally, to the shape of the internal surface of the head part of the plastic product to be produced,
in which the first, second and third mould parts can be moved with respect to each other between a closed position, in which the first, second and third mould parts bear against each other to form a closed mould cavity, and an open position, in which the first, second and third mould parts have been moved apart,
in which the system is furthermore provided with:
  a label transfer device for arranging a peripheral label in the second mould cavity and for arranging a neck label in the first mould cavity, in which the label transfer device is provided with a mandrel for accommodating the peripheral label, and
  the mandrel is displaceable between a peripheral label-receiving position of the mandrel outside the injection mould, in which the peripheral label can be arranged around a peripheral wall of the mandrel, and a peripheral label-dispensing position in the second mould cavity, in which the peripheral label can be transferred from the peripheral wall of the mandrel to the wall of the second mould cavity, and
  the label transfer device is furthermore provided with a holder for accommodating an annular neck label, and
  the holder is displaceable between a neck label-receiving position of the holder outside the injection mould, in which the neck label can be arranged on the holder, and a neck label-dispensing position, in which the neck label can be dispensed in the first mould cavity of the first mould part.

The operation and advantages of this system have been described above.

In an embodiment, the holder is arranged on a carrier which is provided with engagement members for engaging with a produced injection-moulded product, in which the carrier is rotatable about a substantially vertical axis of rotation between an angular position for removing the injection-moulded product and an angular position for dispensing the neck label, and in which the engagement members of the carrier are designed to remove, in the angular position for removing the injection-moulded product, a produced injection-moulded product which is held by the first mould part, and in which the carrier is designed to rotate, after the retained injection-moulded product has been removed from the first mould part, about the axis of rotation to the angular position for dispensing the neck label, in which the holder can be moved to the neck label-dispensing position for dispensing the neck label in the first mould cavity of the first mould part for dispensing the neck label in the first mould cavity of the first mould part.

The above-described features with respect to the method according to the invention can also be used with the system according to the invention.

In a particular embodiment of the system, the injection mould has an axial axis, in which the first, second and third mould parts of the injection mould can be moved along the axial axis, and in which the mandrel and the holder are arranged on a carriage which is guided so as to be displaceable substantially transversely to the axial axis, and in which the mandrel and the holder are each displaceable independently from one another substantially parallel to the axial axis with respect to the carriage. If the mandrel and the holder, in the open position of the first, second and third mould parts, are moved by driving the carriage between the first and second mould parts, the displacement of the mandrel to the peripheral label-dispensing position can take place independently from the displacement of the holder to the peripheral label-dispensing position.

The invention also relates to a label transfer device for arranging an annular neck label in a first mould cavity and for arranging a peripheral label in a second mould cavity of an injection mould, comprising:

a mandrel for accommodating the peripheral label, which mandrel is displaceable between a peripheral label-receiving position outside the injection mould, in which the peripheral label can be arranged around a peripheral wall of the mandrel, and a peripheral label-dispensing position in the second mould cavity, in which the peripheral label can be transferred from the peripheral wall of the mandrel to the wall of the second mould cavity, and a holder for accommodating the neck label, which holder is displaceable between a neck label-receiving position outside the injection mould, in which the neck label can be arranged on the holder, and a neck label-dispensing position, in which the neck label can be dispensed in the first mould cavity of the first mould part.

The invention furthermore relates to a label transfer device for arranging an annular neck label in a first mould cavity and for arranging a peripheral label in a second mould cavity of an injection mould, which label transfer device comprises:

a first displacement device which is displaceably guided along a guide member and which comprises a mandrel for accommodating the peripheral label, which first displacement device is configured to move the mandrel in a direction substantially transversely with respect to the guide member, and a second displacement device which is displaceably guided along the guide member and which comprises a holder for accommodating the neck label, which second displacement device is configured to move the holder in a direction substantially transversely with respect to the guide member, and in which the first displacement device and the second displacement device are configured such that the displacement of the mandrel in the direction substantially transversely to the guide member is independent from the displacement of the holder in the direction substantially transversely to the guide member.

In this case, it is possible for a peripheral label accommodated by the mandrel to be displaceable between a peripheral label-receiving position outside the injection mould, in which the peripheral label can be arranged around a peripheral wall of the mandrel, and a peripheral label-dispensing position in the second mould cavity, in which the peripheral label can be transferred from the peripheral wall of the mandrel to the wall of the second mould cavity. In addition, a neck label which is accommodated by the holder may be displaceable between a neck label-receiving position outside the injection mould, in which the neck label can be arranged on the holder, and a neck label-dispensing position, in which the neck label can be dispensed in the first mould cavity of the first mould part.

According to the invention, it is preferred that the label transfer device is provided with a carriage which is displaceably guided along the guide member, in which the first displacement device and the second displacement device are each arranged on the carriage. As the first and second displacement devices are in this case arranged on the common carriage, both the first displacement device and the second displacement device are carried along when the carriage is moved over the guide member. In this case, the displacement of the mandrel and the displacement of the holder substantially transversely to the guide member are controlled independently from each other by means of the first and second displacement devices, respectively. Incidentally, it is also possible for the first displacement device to be displaceable over a first guide rail and for the second displacement device to be displaceable over a second guide rail. In that case, the displacement of the mandrel and the displacement of the holder can also be controlled independently from each other in the direction of the guide rails.

In an embodiment, the second displacement device comprises a carrier which comprises the holder for accommodating the neck label and an engagement member for engaging with a produced injection-moulded product, in which the carrier is rotatable about a substantially vertical axis of rotation between an angular position for removing the injection-moulded product and an angular position for dispensing the neck label. This is advantageous with regard to the speed of the process.

The invention will now be explained in more detail by means of an exemplary embodiment which is illustrated in the figures, in which:

FIG. 1 shows a top view of a system for producing plastic injection-moulded products according to the invention.

FIGS. 2*a* to 2*i* show various steps of an injection-moulding process with the system illustrated in FIG. 1.

FIG. 3 shows a detail III from FIG. 2*h*.

FIG. 5 shows a perspective view of the holder for accommodating the annular neck label of the system illustrated in FIG. 1.

FIG. 6 shows a detail VI from FIG. 4.

Figure 7B:
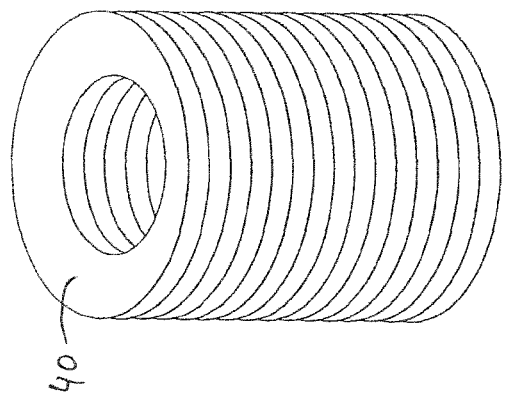
Figure 7A:
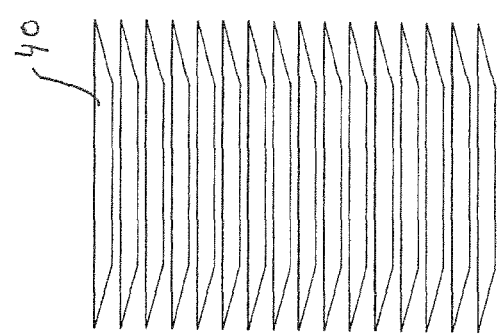

FIGS. 7*a*, 7*b* show dish-shaped neck labels.

Figure 2C:
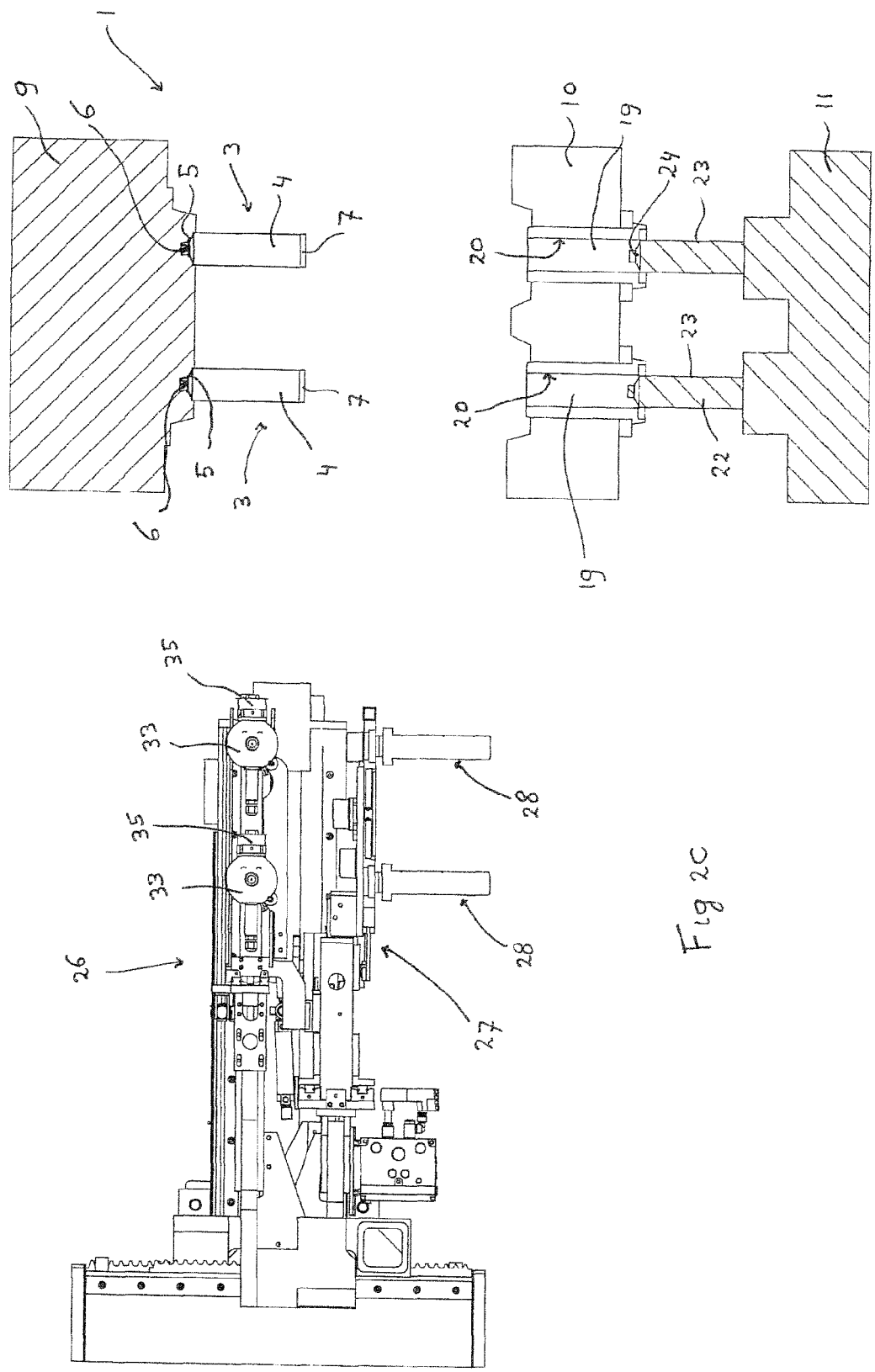
Figure 29:
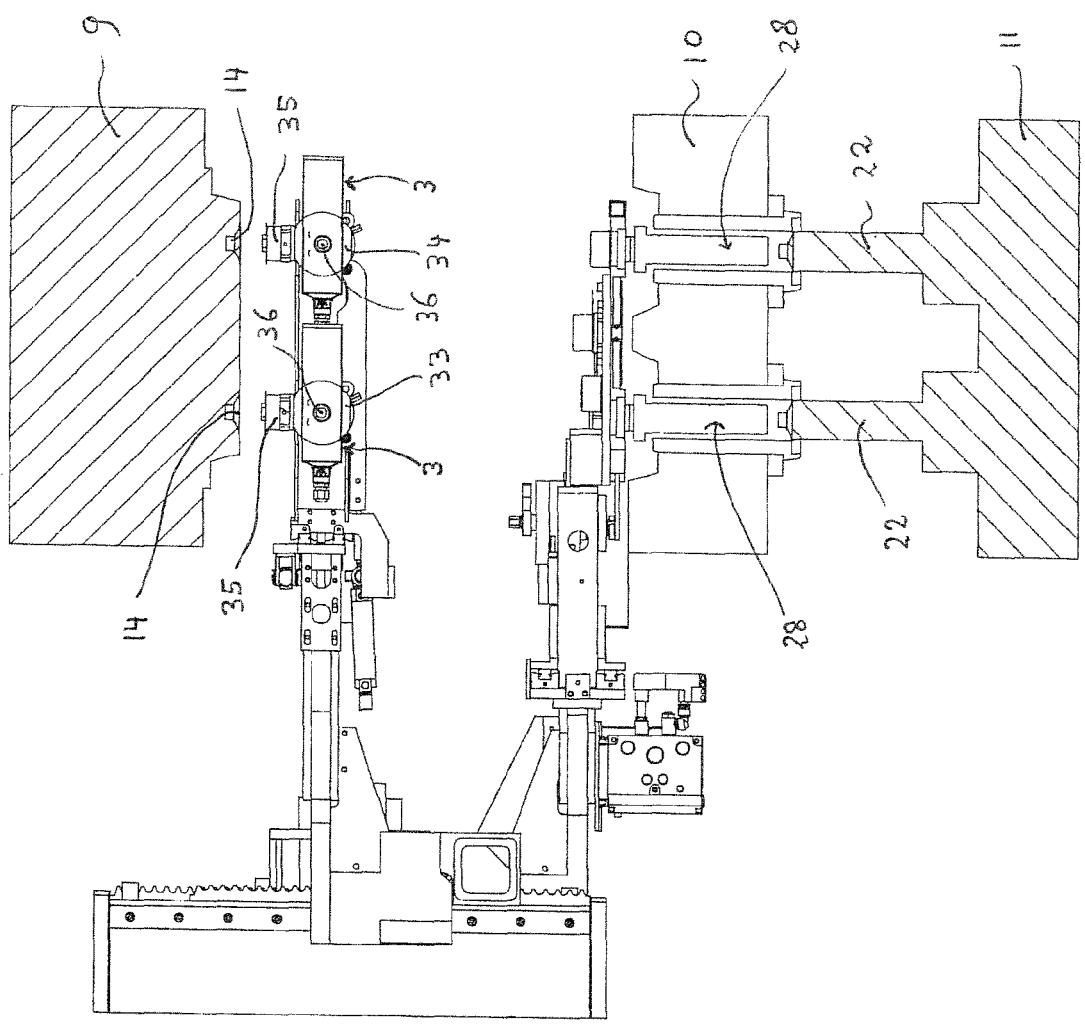
Figure 2R:
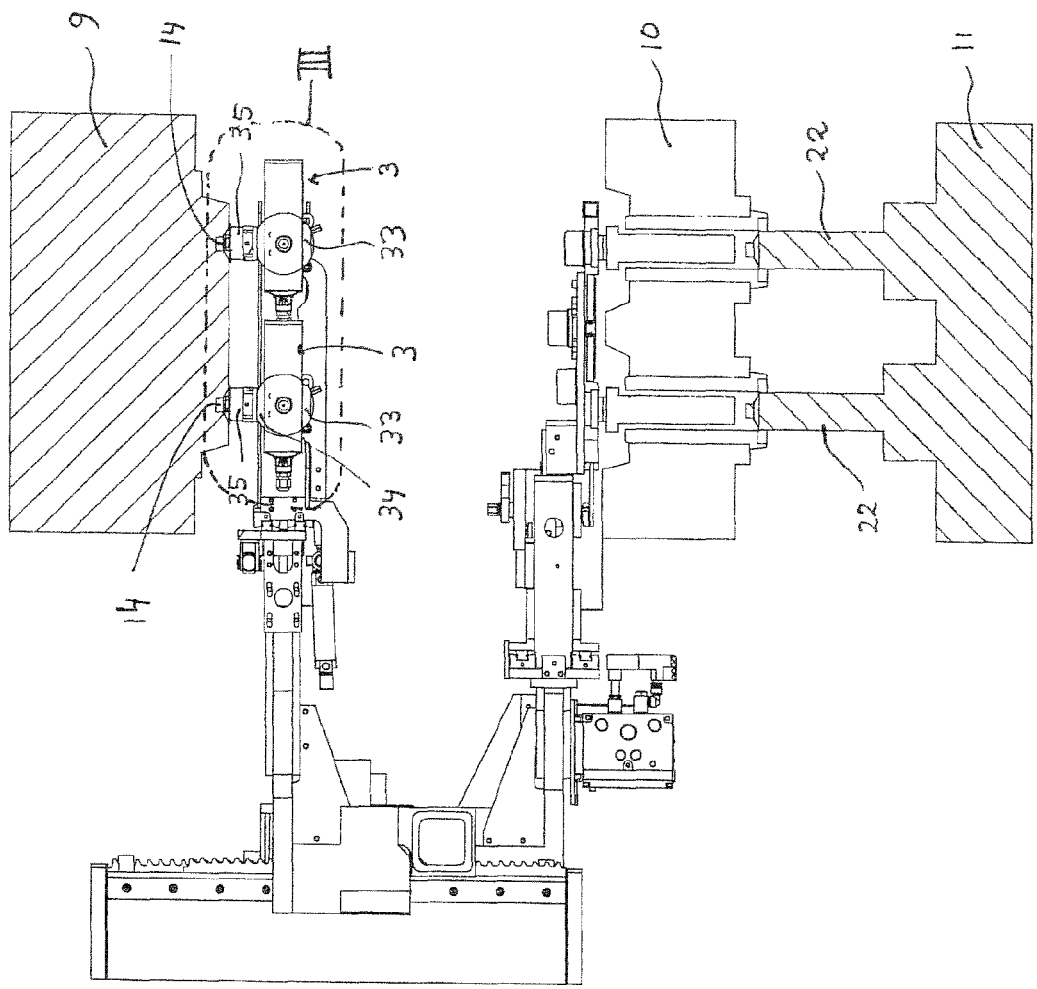
Figure 4:
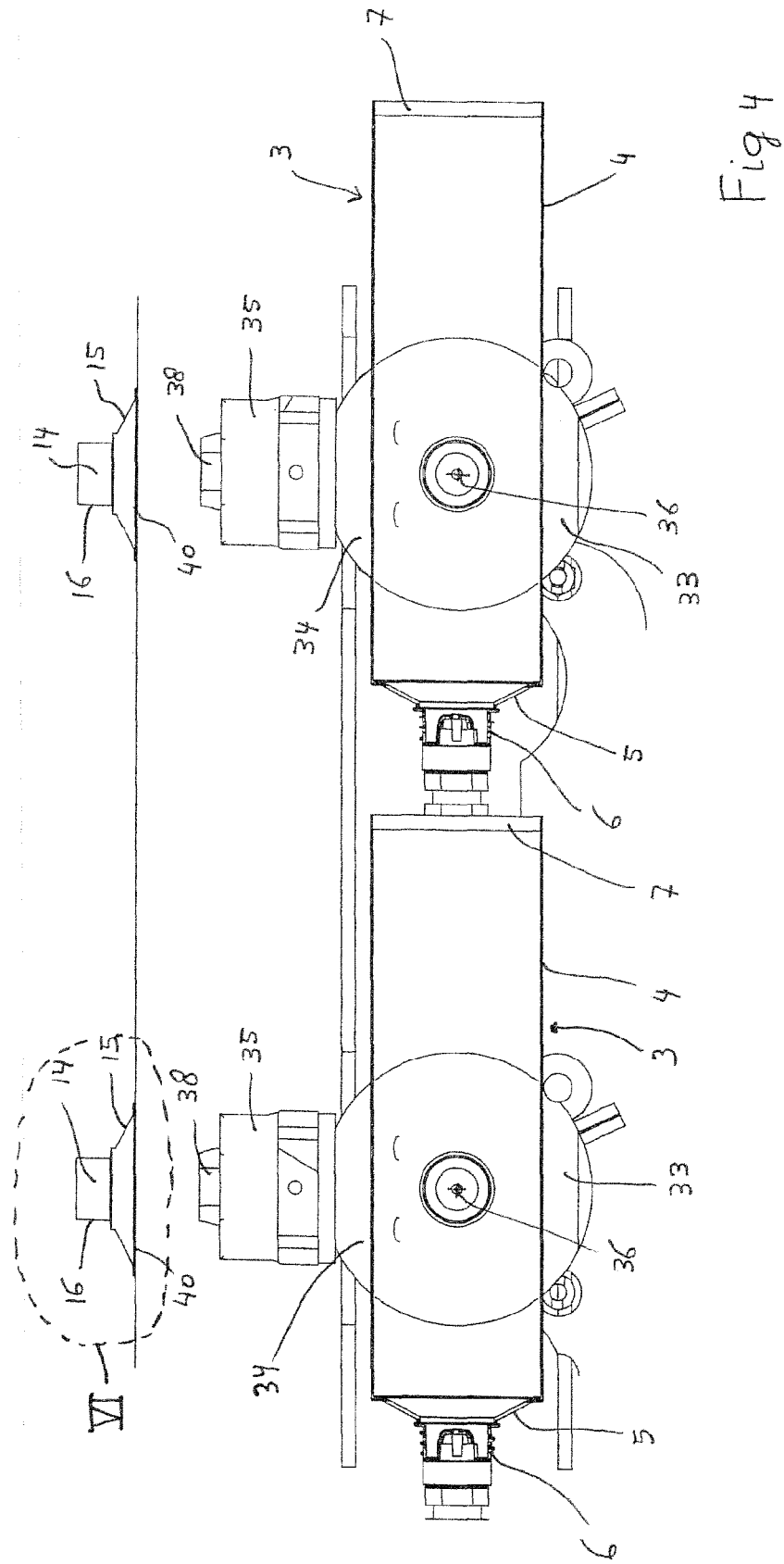
FIG. 4 shows a detail IV from FIG. 2*i*.

FIG. 8 shows the detail VI from FIG. 4 with a dish-shaped neck label accommodated in the first mould cavity.

The system for producing plastic injection-moulded products illustrated in the figures comprises an injection mould 1 and a label transfer device 26. In this exemplary embodiment, the system is designed for "in-mould labelling" of plastic collapsing tube products 3 (see also FIGS. 3 and 4). Each collapsing tube product 3 comprises a tubular body 4 and a neck part 5 which is connected to an end of the tubular body 4. A head part 6 is connected to the end of the neck part 5 facing away from the tubular body 4.

The head part 6 contains an outlet opening. The head part 6 is provided with external screw thread, so that for example a lid can be screwed onto the head part 6 to close off the outlet opening. The tubular body 4 of the collapsing tube product 3 comprises an open end 7 which is situated opposite the head part 6 and can be flattened and closed. The tubular body 4 can be filled via the open end 7. If the open end 7 is flattened and closed after filling, a filled plastic collapsing tube has been produced.

As is illustrated in FIGS. 1 and 2*a* to 2*i*, the injection mould 1 comprises three mould parts 9, 10, 11. The first mould part 9 comprises several first mould cavities 14. The wall of each first mould cavity 14 comprises a first wall part 15 which corresponds to the shape of the external surface of the neck part 5 of the collapsing tube product 3 to be produced. In this exemplary embodiment, the first wall part 15 comprises a flat continuous edge part 15*a* and an oblique wall part 15*b* (see FIGS. 6 and 8).

The wall of each first mould cavity 14 furthermore comprises a second wall part 16 which corresponds to the shape of the external surface of the head part 6 of the collapsing tube product 3 to be produced (see FIGS. 3 and 4). The first mould part 9 is provided with supply ducts for supplying plastic to the first mould cavities 14 (not illustrated).

The second mould part 10 comprises several second mould cavities 19. Each second mould cavity 19 comprises a peripheral wall 20 which corresponds to the shape of the external surface of the tubular body 4 of the collapsing tube product 3 to be produced. The third mould part 11 comprises several core bodies 22. The wall of each core body 22 comprises a first wall part 23 which corresponds to the shape of the internal surface of the tubular body 4 of the collapsing tube product 3 to be produced, and a second wall part 24 which corresponds to the shape of the internal surface of the neck part 5 and to the shape of the internal surface of the head part 6 of the collapsing tube product 3 to be produced. The second wall part 24 is situated on the head end of the core body 22.

The first, second and third mould parts 9, 10, 11 of the injection mould 1 can be displaced with respect to each other according to a straight line in the direction of the axial axis 12 between a closed position and an open position. In the closed position (see FIG. 2*a*), the first, second and third mould parts 9, 10, 11 bear against each other to form a closed mould cavity. In the open position (see FIGS. 2*c* to 2*i*), the first, second and third mould parts 9, 10, 11 have been moved apart, so that the first and second mould cavities 14, 19 are accessible.

The core bodies 22, the second mould cavities 19 and the first mould cavities 14 are aligned with respect to each other, that is to say the axial axes of each group consisting of core body 22, second mould cavity 19 and first mould cavity 14 which belong together, substantially coincide. These axial axes run substantially parallel to the axial axis 12 of the injection mould.

The label transfer device 26 is designed to arrange a peripheral label in the second mould cavity 19 and to arrange an annular neck label 40 in the first mould cavity 14, in the open position of the first, second and third mould parts 9, 10, 11. The peripheral label and the neck label are two separate labels. The label transfer device 26 comprises a carriage 90 and two displacement units 27, 32.

The carriage 90 is displaceably guided along a guide rail 91 which substantially is arranged transversely to the axial axis 12 of the injection mould 1. In the open position of the first, second and third mould parts 9, 10, 11, the guide rail 91 is aligned between the first and second mould parts 9, 10. The displacement units 27, 32 can be displaced with respect to the carriage 90 independently from one another substantially parallel to the axial axis 12.

The first displacement unit 27 comprises several mandrels 28 for accommodating peripheral labels. The mandrels 28 can be displaced collectively between a peripheral label-receiving position outside the injection mould 1 and a peripheral label-dispensing position in the second mould cavities 19. The second displacement unit 32 comprises several carriers 33 which each comprise a holder 35 for accommodating the neck label 40. Each carrier 33 is furthermore provided with engagement members 34 for engaging with a produced collapsing tube product 3. Each carrier 33 is rotatable about a substantially vertical axis of rotation between an angular position for removing the injection-moulded product and an angular position for dispensing the neck label. The holders 35 which are arranged on the carriers 33 can be displaced collectively between a neck label-receiving position outside the injection mould and a neck label-dispensing position.

As is illustrated in FIG. 5, each holder 35 comprises a stop surface 37 and a centering lug 38 which projects from the stop surface 37. The stop surface 37 is provided with retaining devices for retaining the annular neck label. In this exemplary embodiment, the retaining devices are designed as suction openings for exerting a suction force on the neck label 40.

The operation of the system for producing the plastic collapsing tube product 3 will now be described with reference to FIGS. 2a to 2i.

FIG. 2a shows the closed position of the first, second and third mould parts 9, 10, 11, in which the first, second and third mould parts 9, 10, 11 bear against each other to form the closed mould cavity of the injection mould 1. The closed mould cavity contains a peripheral label and an annular neck label which have been arranged in the second mould cavity 19 and the first mould cavity 14 beforehand, as will be explained in more detail below. Plastic is injected into the first mould cavity 14 via the supply duct in the first mould part 9.

The plastic is sprayed against the neck label 40, so that the neck label 40 is moved from the wall part 15 of the first mould cavity 14 to the wall part 24 of the core body 22 (overmoulding of the neck label 40). The plastic fills the entire closed mould cavity of the injection mould 1. As a result, the plastic collapsing tube product 3 is moulded, in which the peripheral label and the neck label 40 have been incorporated (in-mould labelling). The neck label in the neck part 5 of the collapsing tube product 3 is thus covered by the plastic. After the collapsing tube product 3 has been produced, the neck label 40 is situated on the inner side of the neck part 5.

While the collapsing tube product 3 is being formed in the injection mould 1, the mandrels 28 and the carriers 33 with the holders 35 are situated outside the injection mould. During the time in which the injection-moulding process takes place, in the peripheral label-receiving position of the mandrels 28 outside the injection mould 1, the peripheral labels are wound around the peripheral walls 29 of the mandrels 28 and then retained. Simultaneously, in the neck label-receiving position of the holders 35 outside the injection mould 1, the neck labels 40 are also arranged around the centring lugs 38 of the holders 35 and then retained.

After the collapsing tube product 3 has been produced, the first, second and third mould parts 9, 10, 11 of the injection mould 1 are moved apart into the open position. First, the third mould part 11 moves out of the second mould part 10 while the second mould part continues to rest on the first mould part 9 (see FIG. 2b). Subsequently, the second mould part 10 is moved away from the first mould part 9. During this process, the third mould part 11 moves along with the second mould part 10, so that the distance between the second and third mould parts 10, 11 remains substantially equal (see FIG. 2c).

During the displacement of the second mould part 10, the external screw thread of the head part 6 of the produced collapsing tube product 3 remains stuck in the first mould cavity 14 of the first mould part 9. The produced collapsing tube products 3 therefore are retained by the first mould part 9. In this exemplary embodiment, the first mould part 9 comprises two cooperating sliding bodies which are slidable between a closed position, in which the external screw thread of the head part 6 of the produced collapsing tube products 3 is enclosed, and an open position, in which the external screw thread of the head part 6 can be released from the first mould cavity 14.

The first and second displacement units 27, 32 can be controlled independently from one another. In the open position of the first, second and third mould parts 9, 10, 11 (see FIG. 2c), the displacement units 27, 32 are operated in such a manner that the mandrels 28 with the accommodated peripheral labels and the carriers 33 and the attached holders 35 with the accommodated neck labels 40 are placed between the first mould part 9 and the second mould part 10 (see FIG. 2d).

The mandrels 28 with the accommodated peripheral labels are then arranged in the second mould cavities 19 of the second mould part 10 (see FIG. 2e). The mandrels 28 are then in the peripheral label-dispensing position, in which the peripheral labels are transferred from the peripheral wall 29 of the mandrels 28 to the peripheral wall 20 of the second mould cavities 19.

By using the mandrels 28 to arrange the peripheral labels in the second mould cavities 19, it is possible to ensure that the peripheral labels are placed accurately in the correct position in the second mould cavities 19. After the peripheral labels have been transferred to the peripheral wall 20 of the second mould cavities 19, the mandrels 18 move back out of the second mould cavities 19 without peripheral labels (see FIG. 2i).

While the peripheral labels are deposited in the second mould cavities 19 by means of the mandrels 28, the second displacement unit 32 displaces the carriers 33 in the angular position for removing the injection-moulded product as far as underneath the collapsing tube products 3 which hang with their head parts 6 in the first mould cavities 14 of the first mould part 9 (see FIG. 2d). Subsequently, the engagement members 34 of the carriers 33 engage with the tubular body 4 of the hanging collapsing tube products 3 (see FIG. 2e).

In this exemplary embodiment, the carriers 33 have a bottom having a shape which corresponds to the tubular body 4. The bottom of the carriers 33 is moved against the tubular body 4 of the produced collapsing tube products 3, after which the tubular body 4 is secured. When the tubular body of the hanging collapsing tube products 3 is secured, the carriers 33 then move in the axial direction, away from the first mould part 9. As a result thereof, the carriers 33 pull the hanging collapsing tube products 3 from the first mould cavities 14 of the first mould part 9 (see FIG. 2f).

After the hanging collapsing tube products 3 have been removed, the carriers 33 are rotated about the axis of rotation 36 thereof, in this exemplary embodiment over an angle of approximately 90°, to the angular position for dispensing the neck label. The tubular bodies 4 of the collapsing tube products 3 then run transversely to the axial axis 12 of the injection mould 1 and the neck labels 40 arranged on the holders 35 are turned towards the first mould part 9 (see FIG. 2g).

While the carriers 33 remain in the angular position for dispensing the neck label, the second displacement unit 32 moves the carriers 33 with the holders 35 attached thereto along the axial axis 12 towards the first mould part 9. The neck labels 40 which are accommodated on the holders 35 are in this case aligned with respect to the first mould cavities 14 of the first mould part 9. Each holder 35 with an accommodated neck label 40 is then in the neck label-dispensing position (see FIGS. 2h and 3).

The neck labels 40 are then dispensed in the first mould cavities 14 of the first mould part 9. In this exemplary embodiment, a peripheral edge of each neck label 40 is accommodated against the flat continuous edge part 15a of the wall part 15 of the first mould cavity 14 (see FIG. 6). The remaining part of the neck label 40 is then situated at a distance of 5 the wall 15, 16 of the first mould cavity 14 the neck label 40 does not come to bear against the wall 15, 16 of the first mould cavity 14 in a close-fitting manner in its entirety.

The neck label 40 can be fixed in the first mould cavity 14 of the first mould part 9 in various ways. For example, the neck label 40 can be held by means of charging or suction openings are provided in the flat continuous edge part 15a for retaining the peripheral edge of the neck label 40 (not shown).

FIGS. 7a, 7b show dish-shaped neck labels, each of which is frustoconical. If such a dish-shaped neck label 40 is arranged in the first mould cavity 14 of the first mould part 9, the dish-shaped neck label 40 bears against the oblique wall part 15b of the first wall part 15. This is shown in FIG. 8. In this case as well, the neck label 40 can be held by charging or by suction action or in another way.

After the neck labels 40 have been transferred in the neck label-dispensing position of the holders 35, the carriers 33 again move away from the first mould part 9 (see FIGS. 2i and 4) along the axial axis 12. In that case, the neck labels 40 remain behind in the first mould cavities 14 of the first mould part 9.

Subsequently, the carriers 33 are moved back transversely to the axial axis 12 of the injection mould 1 from between the first and second mould parts 9, 10, so that the first, second and third mould parts 9, 10, 11 of the injection mould 1 can move from the open position to the closed position. In the case of a flat neck label 40, as illustrated in FIG. 6, the second wall part 24 of the core body 22 moves against the neck label 40, as a result of which the neck label 40 deforms. Incidentally, in this case, it is possible that the neck label 40 may crease. However, this is not visible on the outer side of the collapsing tube product 3, since the neck label 40 is overmoulded. When using a dish-shaped neck label 40 (see FIG. 8), the peripheral edge of the neck label 40 deforms due to the presence of the core body 22 in the closed position of the first, second and third mould parts 9, 10, 11.

After the first, second and third mould parts 9, 10, 11 of the injection mould 1 have been moved from the open position to the closed position, the situation illustrated in FIG. 2a is reached again.

Using this system, the peripheral labels and the neck labels 40 can be arranged accurately in the desired positions, independently from one another. This ensures that the peripheral labels and the neck labels 40 have been integrally formed accurately in the desired position in the plastic collapsing tube products 3 after injection-moulding.

The invention is not limited to the exemplary embodiment illustrated in the figures. The person skilled in the art may make various modifications which are within the scope of the invention. For example, the injection mould illustrated in the figures comprises eight mould cavities, but obviously, the injection mould may comprise more or fewer mould cavities. In addition, the above-described features and/or the features mentioned in the claims can each be used separately or in any desired combination in the method according to claim 1 and the system according to claim 11, and also in the above-described label transfer device.

The invention claimed is:

1. A method for producing, in an injection mould, a plastic product comprising a tubular body, a neck part which is connected to an end of the tubular body, and a head part which is connected to an end of the neck part facing away from the tubular body, wherein the injection mould comprises:
   a first mould part which is provided with a first mould cavity having a wall which corresponds to a shape of an external surface of the neck part and of the head part of the plastic product to be produced, wherein the first mould part is provided with a supply duct for the supply of plastic, and wherein the supply duct opens into the first mould cavity,
   a second mould part which is provided with a second mould cavity having a wall which corresponds to a shape of an external surface of the tubular body of the plastic product to be produced, and
   a third mould part which is provided with a core body having a wall which corresponds to a shape of an internal surface of the tubular body and to a shape of an internal surface of the neck part and, optionally, to a shape of an internal surface of the head part of the plastic product to be produced,
wherein the method comprises:
   moving the first, second and third mould parts of the injection mould apart into an open position to enable placement of a peripheral label in the second mould cavity,
   in the open position of the first, second and third mould parts, placing the peripheral label in the second mould cavity,
   moving the first, second and third mould parts from the open position to a closed position, in which the first, second and third mould parts bear against each other to form a closed mould cavity, and
   supplying plastic via the supply duct of the first mould part to form the plastic product in the closed mould cavity,
characterized in that
   the peripheral label is placed in the second mould cavity by a label transfer device, which is provided with a mandrel for accommodating the peripheral label, and in that the peripheral label is arranged around a peripheral wall of the mandrel of the label transfer device in a peripheral label-receiving position of the mandrel outside the injection mould, in the open position of the first, second and third mould parts, the mandrel with the peripheral label arranged around the peripheral wall thereof are moved from the peripheral label-receiving position outside the injection mould to a peripheral label-dispensing position in the second mould cavity, the peripheral label is transferred from the peripheral wall of the mandrel to the wall of the second mould cavity in the peripheral label-dispensing position of the mandrel, the mandrel is returned from the peripheral label-dispensing position the peripheral label-receiving position outside the injection mould, and in that the label transfer device is furthermore provided with a holder for accommodating an annular neck label, and in that, the neck label is arranged on the holder of the label transfer device in a neck label-receiving position of the holder outside the injection mould, in the open position of the first, second and third mould parts, the holder with the accommodated neck label are moved from the neck label-receiving position outside the injection mould to a neck label-dispensing position for dispensing the neck label in the first mould cavity of the first mould part, the neck label is transferred from the holder to the first mould cavity in the neck label-dispensing position of the holder, and the holder is returned from the neck label-dispensing position to the neck label-receiving position outside the injection mould.

2. The method according to claim 1, in which, after the neck label, in the neck label-dispensing position of the holder, has been transferred from the holder to the first mould cavity, the neck label extends partly at a distance from the wall of the first mould cavity.

3. The method according to claim 1, in which, after the neck label, in the neck label-dispensing position of the holder, has been transferred from the holder to the first mould cavity, the neck label partly rests against the wall of the first mould cavity, and in which, when supplying plastic via the supply duct of the first mould part, the plastic is injected into the first mould cavity in such a manner that the annular neck label is moved in a direction towards the core body.

4. The method according to claim 1, in which the holder is arranged on a carrier which is provided with engagement members for engaging with a produced injection-moulded product, in which the carrier is rotatable about a substantially vertical axis of rotation between an angular position for removing the injection-moulded product and an angular position for dispensing the neck label, and in which, after the injection-moulded product has been produced, the first, second and third mould parts of the injection mould move apart into the open position and the produced injection-moulded product is retained by the first mould part, and in which then the engagement members of the carrier in the angular position for removing the injection-moulded product remove the retained injection-moulded product from the first mould part, and in which, after the retained injection-moulded product has been removed from the first mould part, the carrier is rotated about the axis of rotation thereof into the angular position for dispensing the neck label, in which, in the angular position of the carrier for dispensing the neck label, the holder with the accommodated neck label are moved to the neck label-dispensing position for dispensing the neck label in the first mould cavity of the first mould part and the neck label is deposited in the first mould cavity of the first mould part.

5. The method according to claim 4, in which the carrier is rotatable over an angle of substantially 90° between the angular position for removing the injection-moulded product and the angular position for dispensing the neck label.

6. The method according claim 1, in which, after the plastic product has been produced, the first, second and third mould parts of the injection mould move apart into the open position and the produced plastic product is retained by the first mould part, and in which, in the open position of the first, second and third mould parts, the mandrel with the peripheral label arranged around the peripheral wall thereof and the holder with the accommodated neck label are moved substantially simultaneously between the first and second mould parts, and in which then the peripheral label is transferred from the peripheral wall of the mandrel to the wall of the second mould cavity and simultaneously the produced plastic product is removed from the first mould part and/or the neck label is transferred to the first mould cavity of the first mould part.

7. The method according to claim 1, in which the holder is provided with a stop surface with retaining devices for retaining the annular neck label, as well as a centring lug which projects from the stop surface, in which the annular neck label is accommodated around the centring lug of the holder and the retaining devices retain the neck label while the holder is moved from the neck label-receiving position to the neck label-dispensing position.

8. The method according to claim 1, in which, after the plastic product has been produced, the first, second and third mould parts of the injection mould move apart into the open position by the third mould part first moving at least partly out of the second mould part while the second mould part remains in contact with the first mould part, and the second mould part then moving away from the first mould part.

9. The method according claim 1, in which the injection mould has an axial axis, and in which the first, second and third mould parts of the injection mould can be moved along the axial axis.

10. The method according to claim 1, in which the peripheral label and/or the neck label comprise a material which is substantially impermeable to gas or vapour, for example an oxygen barrier layer.

11. A system for producing a plastic injection-moulded product comprising a tubular body, a neck part which is connected to an end of the tubular body, and a head part which is connected to an end of the neck part facing away from the tubular body, wherein the system comprises:

an injection mould, comprising:

a first mould part which is provided with a first mould cavity having a wall which corresponds to a shape of an external surface of the neck part and of the head part of the plastic product to be produced, wherein the first mould part is provided with a supply duct for the supply of plastic, and wherein the supply duct opens into the first mould cavity, a second mould part which is provided with a second mould cavity having a wall which corresponds to a shape of an external surface of the tubular body of the plastic product to be produced, and a third mould part which is provided with a core body having a wall which corresponds to a shape of an internal surface of the tubular body and to a shape of an internal surface of the neck part and, optionally, to a shape of an internal surface of the head part of the plastic product to be produced, in which the first, second and third mould parts can be moved with respect to each other between a closed position, in which the first, second and third mould parts bear against each other to form a closed mould cavity, and an open position, in which the first, second and third mould parts have been moved apart, characterized in that the system is furthermore provided with:

a label transfer device for arranging a peripheral label in the second mould cavity and for arranging a neck label in the first mould cavity, in which the label transfer device is provided with a mandrel for accommodating the peripheral label, and in that the mandrel is displaceable between a peripheral label-receiving position of the mandrel outside the injection mould, in which the peripheral label can be arranged around a peripheral wall of the mandrel, and a peripheral label-dispensing position in the second mould cavity, in which the peripheral label can be transferred from the peripheral wall of the mandrel to the wall of the second mould cavity, and in that the label transfer device is furthermore provided with a holder for accommodating an annular neck label, and in that the holder is displaceable between a neck label-receiving position of the holder outside the injection mould, in which the neck label can be arranged on the holder, and a neck label-dispensing position, in which the neck label can be dispensed in the first mould cavity of the first mould part.

12. The system according to claim 11, in which the holder is arranged on a carrier which is provided with engagement members for engaging with a produced injection-moulded product, in which the carrier is rotatable about a substantially vertical axis of rotation between an angular position for removing the injection-moulded product and an angular position for dispensing the neck label, and in which the engagement members of the carrier are configured to remove, in the angular position for removing the injection-moulded product, a produced injection-moulded product which is retained by the first mould part, and in which the carrier is configured to rotate, after the retained injection-moulded product has been removed from the first mould part, about the axis of rotation to the angular position for dispensing the neck label, in which the holder can be moved to the neck label-dispensing position for dispensing the neck label in the first mould cavity of the first mould part for dispensing the neck label in the first mould cavity of the first mould part.

13. The system according to claim 11, in which the carrier is rotatable over an angle of substantially 90° between the angular position for removing the injection-moulded product and the angular position for dispensing the neck label.

14. The system according to claim 11, in which the injection mould has an axial axis, and in which the first, second and third mould parts of the injection mould can be moved along the axial axis, and in which the mandrel and the holder are arranged on a carriage which is guided so as to be displaceable substantially transversely to the axial axis, and in which the mandrel and the holder are each displaceable independently from one another substantially parallel to the axial axis with respect to the carriage.

\* \* \* \* \*